C. COLAHAN.
Grain-Binder.
No. 198,735. Patented Jan. 1, 1878.
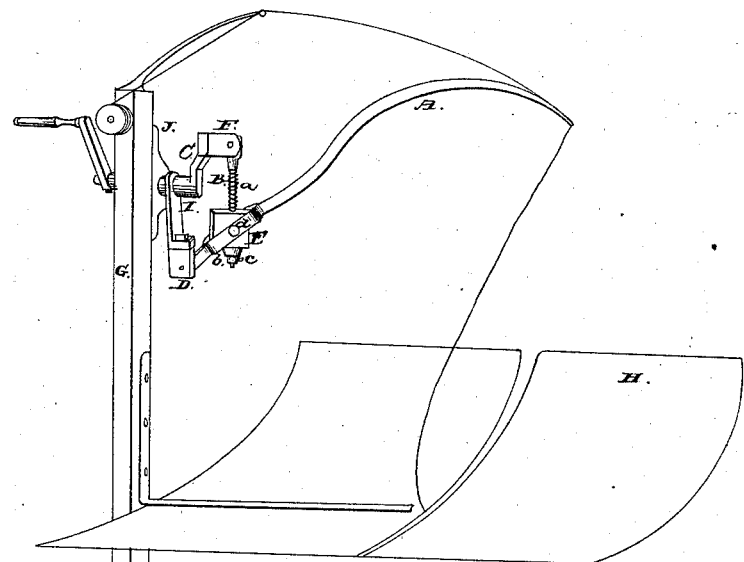
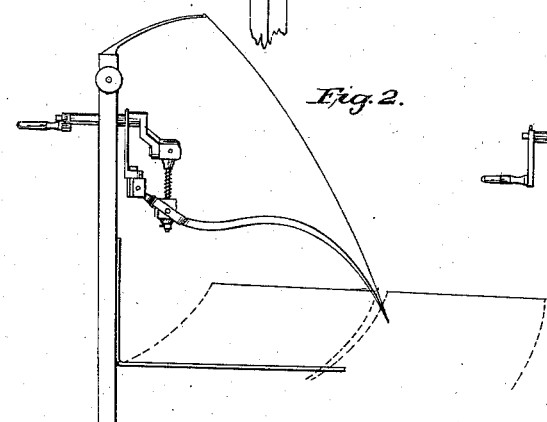
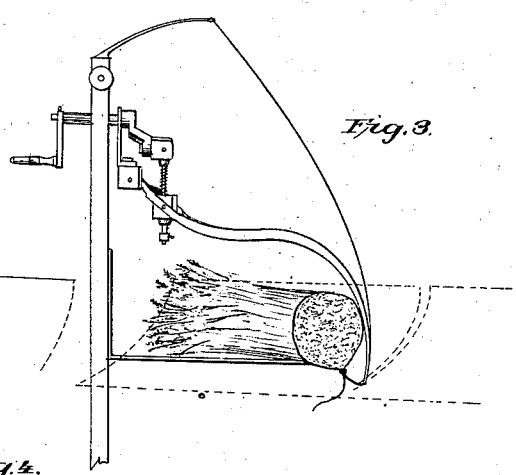
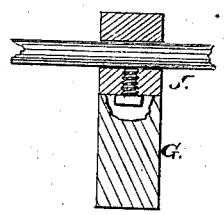
Attest:
George E. Upham
C. H. McEwen
Inventor:
Chas H Colahan

UNITED STATES PATENT OFFICE.

CHARLES COLAHAN, OF CLEVELAND, OHIO.

IMPROVEMENT IN GRAIN-BINDERS.

Specification forming part of Letters Patent No. 198,735, dated January 1, 1878; application filed August 28, 1877.

*To all whom it may concern:*

Be it known that I, CHARLES COLAHAN, of Cleveland, in the county of Cuyahoga and State of Ohio, have invented certain new and useful Improvements in Self-Binding or Automatic Grain-Binders for Harvesters; and I do hereby declare that the following is a full, clear, and exact description thereof, reference being had to the accompanying drawings, making part of this specification.

Figure 1 is a view of the binding-arm, located at one end of the receiver of the harvester, the said binding-arm being attached above said receiver, with the mechanism that operates it, on the upright post G. Figs. 2 and 3 represent different positions of the binding-arm, and the machinery operating the same, in the several stages of its work in the operation of binding grain. Fig. 4 is a cross-section through post G and box J, showing the means for adjusting the sleeve.

The object of my invention is mainly to simplify the construction of self-binding grain-binders, the same to be attached to and operated by the machine harvesting the grain.

G, Fig. 1, represents a post attached to the side of the harvester and at one end of the receiver H, on which the cut grain is delivered by the harvester; and to post G the box J is securely attached, while a sleeve or hollow arm, with down-hanger I attached, passes through said box or support J. Said sleeve has a set-screw to hold it in any desired position. In setting the position of the binder-arm, said set-screw (shown in Fig. 4) passes through the box J securely against the sleeve or hollow journal to which down-hanger I is attached.

D is a lug or knee, pivoted to said adjustable down-hanger I, and supports the wire or cord carrying arm at its inner end. C is a crank, revolved by a shaft passing through sleeve in box J. To the outer end of said crank is pivoted a lug, F, and to said lug is hinged the piston or supporting rod B. To said piston or rod is attached the wire or cord carrying arm A, by passing loosely through a head, E, pivoted to the arm A, whereby the arm is actuated in binding grain. The piston or rod B has an adjustable collar, $b$, secured at its lower end by a set-screw, $c$, for the purpose of regulating and adjusting the arm.

$a$ is an elastic coil-spring interposed between the pivoted support F and wire-carrying arm A, or its supporting-lug E, that the downward stroke of arm A may not be too sudden, and to relieve the strain on the cord or wire and arm in closing around the bundle.

Said mechanism is actuated by a chain or belt from a sprocket-wheel, secured on the shaft where the crank-handle is represented as secured.

Suitable mechanism for securing the band is to be provided; but as it may be of any desired form I have not shown or described it.

What I claim as new, and desire to secure by Letters Patent, is—

1. The wire-carrying binder-arm, supported on the adjustable down-hanger I, as shown and described, in combination with the mechanism operating the same, all having a single or common support, J.

2. The band-carrying arm, actuated by crank C, in combination with pivoted lugs F and E and piston-rod B, as shown and described.

3. The combination of the pivoted wire-carrying arm, the piston operating said arm, and the spring for allowing a yielding movement between said arm and piston, substantially as described.

4. The combination of the box J, the sleeve supporting down-hanger I, the pivoted lug D, the arm A, the pivoted lug E, with the piston-rod B, having the adjustable collar $b$, and spring $a$, with pivoted crank-pin F and crank C, as shown and described.

5. The combination of the pivoted wire-carrying arm and the piston pivoted to and operating said arm, substantially as described.

In testimony that I claim the above I have hereunto subscribed my name in the presence of two witnesses.

CHAS. COLAHAN.

Witnesses:
 C. H. McEWEN,
 GEORGE E. UPHAM.